United States Patent
Negami

(10) Patent No.: US 10,393,203 B2
(45) Date of Patent: Aug. 27, 2019

(54) ACRYLIC RUBBER COMPOSITION

(71) Applicant: NOK CORPORATION, Tokyo (JP)

(72) Inventor: Tetsuro Negami, Tottori (JP)

(73) Assignee: NOK Corporation, Tokyo (JP)

( * ) Notice: Subject to any disclaimer, the term of this patent is extended or adjusted under 35 U.S.C. 154(b) by 44 days.

(21) Appl. No.: 15/559,514

(22) PCT Filed: Mar. 14, 2016

(86) PCT No.: PCT/JP2016/057937
§ 371 (c)(1),
(2) Date: Sep. 19, 2017

(87) PCT Pub. No.: WO2016/152615
PCT Pub. Date: Sep. 29, 2016

(65) Prior Publication Data
US 2018/0119765 A1    May 3, 2018

(30) Foreign Application Priority Data

Mar. 20, 2015   (JP) .................................. 2015-057621

(51) Int. Cl.

| | | |
|---|---|---|
| C08L 33/06 | (2006.01) | |
| F16F 1/36 | (2006.01) | |
| C08K 5/10 | (2006.01) | |
| C08L 25/08 | (2006.01) | |
| C08L 63/00 | (2006.01) | |
| F16F 15/08 | (2006.01) | |
| B60K 5/12 | (2006.01) | |
| C08L 13/00 | (2006.01) | |
| F16F 1/373 | (2006.01) | |

(52) U.S. Cl.
CPC .......... *F16F 1/3605* (2013.01); *B60K 5/1208* (2013.01); *C08K 5/10* (2013.01); *C08L 13/00* (2013.01); *C08L 25/08* (2013.01); *C08L 33/06* (2013.01); *C08L 63/00* (2013.01); *F16F 1/3732* (2013.01); *F16F 15/08* (2013.01); *F16F 2224/025* (2013.01); *F16F 2226/04* (2013.01)

(58) Field of Classification Search
CPC . C08K 5/10; C08L 25/08; C08L 33/06; C08L 63/00; C08L 13/00; F16F 15/08; F16F 1/3605; F16F 1/3732; F16F 2224/025; F16F 2226/04
See application file for complete search history.

(56) References Cited

U.S. PATENT DOCUMENTS

2001/0056153 A1   12/2001   Nakagome
2003/0220440 A1   11/2003   Nakagome

FOREIGN PATENT DOCUMENTS

| JP | 11-158343 | 6/1999 |
|---|---|---|
| JP | 2000-338723 A | 12/2000 |
| JP | 2002-12707 | 1/2002 |
| JP | 2006-152050 A | 6/2006 |
| JP | 2006-233227 A | 9/2006 |
| JP | 2008-255198 A | 10/2008 |
| JP | 2011-74172 A | 4/2011 |
| JP | 2015-21078 A | 2/2015 |

OTHER PUBLICATIONS

International Search Report from corresponding PCT application No. PCT/JP2016/057937 dated Jun. 14, 2016 (4 pgs).
International Preliminary Patentability Report and Written Opinion from corresponding PCT application No. PCT/JP2016/057937 dated Sep. 26, 2017 (9 pgs).

*Primary Examiner* — Nathan M Nutter
(74) *Attorney, Agent, or Firm* — Brinks Gilson & Lione

(57) ABSTRACT

An acrylic rubber composition comprising 5 to 80 parts by weight, preferably 10 to 60 parts by weight, more preferably 20 to 40 parts by weight, of a styrene acrylic-based resin containing a functional group other than a carboxyl group, based on 100 parts by weight of acrylic rubber. A vibration insulation member having an excellent tan δ value at a high temperature and improved vibration insulation properties can be molded by adding a specific ratio of a styrene acrylic-based resin to acrylic rubber. This acrylic rubber composition can be effectively used as a molding material for a mount, a grommet, or the like in the vicinity of an automobile engine used in a high temperature environment.

19 Claims, No Drawings

ACRYLIC RUBBER COMPOSITION

RELATED APPLICATION

This application is a 35 U.S.C. § 371 national phase filing of International Patent Application No. PCT/JP2016/057937, filed Mar. 14, 2016, which claims priority under 35 U.S.C. § 119 to Japanese Patent Application No. 2015-057621, filed Mar. 20, 2015, the entire disclosure of which is hereby expressly incorporated by reference.

TECHNICAL FIELD

The present invention relates to an acrylic rubber composition. More particularly, the present invention relates to an acrylic rubber composition that can form a member having excellent vibration insulation properties at a high temperature.

BACKGROUND ART

Conventional rubber materials have a tendency that tan δ is likely to decrease at a high temperature and vibration insulation effects are impaired. Acrylic rubber is used as a molding material of a vibration insulation member for a mount, a grommet, or the like in the vicinity of an automobile engine used in a high temperature environment; however, the same tendency is also observed in this case. There is a demand for improving this tendency.

PRIOR ART DOCUMENT

Patent Document

Patent Document 1: JP-A-11-158343
Patent Document 2: JP-A-2011-74172
Patent Document 3: JP-A-2000-338723

OUTLINE OF THE INVENTION

Problem to be Solved by the Invention

An object of the present invention is to provide an acrylic rubber composition that is effectively used, for example, as a molding material of a vibration insulation member having a high tan δ value at a high temperature and excellent vibration insulation properties.

Means for Solving the Problem

The above object of the present invention can be achieved by an acrylic rubber composition comprising 5 to 80 parts by weight, preferably 10 to 60 parts by weight, more preferably 20 to 40 parts by weight, of a styrene acrylic-based resin containing a functional group other than a carboxyl group, based on 100 parts by weight of acrylic rubber.

Effect of the Invention

A vibration insulation member having an excellent tan δ value at a high temperature and improved vibration insulation properties can be molded by adding a specific ratio of a styrene acrylic-based resin to acrylic rubber. This acrylic rubber composition can be effectively used as a vibration insulation molding material for a mount, a grommet, or the like in the vicinity of an automobile engine used in a high temperature environment.

EMBODIMENTS FOR CARRYING OUT THE INVENTION

Acrylic rubber is obtained by emulsion polymerization or suspension polymerization of at least one of an acrylic acid ester and a methacrylic acid ester with a crosslinkable group-containing vinyl monomer (see Patent Document 1).

As the ester of acrylic acid or methacrylic acid, an alkyl ester having 1 to 8 carbon atoms or an alkoxy alkyl ester having 2 to 8 carbon atoms is generally used. For example, at least one of methyl acrylate, ethyl acrylate, n-butyl acrylate, 2-ethylhexyl acrylate, 2-methoxyethyl acrylate, 2-ethoxyethyl acrylate, and their corresponding methacrylates is used; preferably at least one of ethyl acrylate, n-butyl acrylate, and 2-methoxyethyl acrylate is used. In particular, when at least one of ethyl acrylate and n-butyl acrylate is used at a ratio of about 30 wt. % or more, preferably about 50 to 99 wt. %, in the copolymerization reaction, not only mechanical properties but also heat resistance will be increased. Therefore, it is desirable to properly use these esters, also in consideration of low temperature characteristics.

Examples of the crosslinkable group-containing vinyl monomer to be copolymerized with such a (meth)acrylic acid ester are listed below. A reactive halogen group-containing vinyl monomer or an epoxy group-containing vinyl monomer is preferably used. Crosslinking using such a crosslinkable group is performed using a crosslinking agent described below; however, vulcanization of an acrylic rubber composition prepared by adding a styrene acrylic-based resin to such crosslinkable group-containing acrylic rubber is preferably performed using sulfur or a sulfur-containing vulcanization accelerator, as described later.

Reactive Halogen Group-Containing Vinyl Monomer:
2-chloroethyl vinyl ether, vinyl chloroacetate, vinyl α-chloropropionate, allyl chloroacetate, chloroethyl acrylate, chloromethyl styrene, etc.

A copolymer of such a monomer is crosslinked by a crosslinking agent, such as polyamine (e.g., diethylenetriamine), polycarbamate, or the like.

Epoxy Group-Containing Vinyl Monomer:
vinyl glycidyl ether, allyl glycidyl ether, glycidyl (meth)acrylate, etc.

A copolymer of such a monomer is crosslinked by a crosslinking agent, such as polyamine (e.g., diethylenetriamine or m-phenylenediamine), polycarboxylic acid (e.g., adipic acid), acid anhydride (e.g., phthalic anhydride or maleic anhydride), polyamide, sulfonamide, or the like.

Hydroxyl Group-Containing Vinyl Monomer:
hydroxyalkyl (meth)acrylate, hydroxyalkoxy acrylate, N-methylolacrylamide, etc.

A copolymer of such a monomer is crosslinked by a crosslinking agent, such as polyisocyanate (e.g., hexamethylene diisocyanate or a blocked isocyanate thereof), polycarboxylic acid (e.g., adipic acid), alkoxymethyl melamine (e.g., methoxymethyl melamine), or the like.

Amide Group-Containing Vinyl Monomer:
acrylamide, methacrylamide, etc.

A copolymer of such a monomer is crosslinked by a crosslinking agent, such as aminoformaldehyde, polyisocyanate (e.g., hexamethylene diisocyanate or a blocked isocyanate thereof), or the like.

Each of these monomers is used in the copolymerization reaction such that at least one of (meth)acrylic acid esters is used at a ratio of about 60 to 99 wt. %, preferably about 70 to 99 wt. %, in the total monomers, and such that the crosslinkable group-containing vinyl monomer is used at a ratio of about 0.1 to 10 wt. %, preferably about 0.2 to 5 wt. %. In this case, other vinyl monomer or olefin monomer, such as (meth)acrylonitrile, vinyl acetate, ethylene, or propylene, may be further copolymerized within a range that does not impair the characteristics of the resulting copolymer, generally within a range of about 40 wt. % or less, preferably about 0.5 to 30 wt. %.

The copolymerization reaction is performed by an emulsion polymerization method or a suspension polymerization method in the presence of a generally used radical polymerization initiator. The radical polymerization initiator may be a redox initiator. The polymerization reaction is performed in the presence of an anionic surfactant, such as sodium lauryl sulfate, sodium dodecylbenzene sulfonate, sodium dialkyl sulfosuccinate, or polyoxyethylene alkylphenyl ether sulfate ammonium salt; or a nonionic surfactant, such as polyoxyethylene nonylphenyl ether, polyethylene glycol monostearate, or sorbitan monostearate, by any method, such as a batch method, a continuous method, or an intermittent addition method, at a temperature of about −10 to 100° C., preferably about 2 to 80° C., to a polymerization conversion of about 90% or more, preferably about 95 to 99.8%. Therefore, each ratio of the monomers supplied almost corresponds to the composition ratio of the copolymer.

Examples of the styrene acrylic-based resin to be added to the above acrylic rubber include copolymer resins obtained by copolymerizing acrylic resin-forming monomers, such as acrylic acid ester, and methacrylic acid ester, with polystyrene resin-forming monomers, such as styrene, α-methylstyrene, and p-methylstyrene, wherein one or both of these components is partially copolymerized with a vinyl monomer, such as vinyl acetate or vinyl chloride, or a functional group, such as an epoxy group, a hydroxyl group, or an amino group, preferably an epoxy group or a hydroxyl group, is incorporated into a styrene acrylic-based resin (see Patent Documents 2 and 3). However, those using a carboxyl group as a functional group have inferior kneading properties, roll processability, and vulcanization molding properties.

The styrene acrylic-based resin is used at a ratio of 5 to 80 parts by weight, preferably 10 to 60 parts by weight, more preferably 20 to 40 parts by weight, based on 100 parts by weight of acrylic rubber. If the ratio of the styrene acrylic-based resin used is less than this range, kneading properties and processability, as well as tan δ (23° C.) and tan δ (70° C.) are excellent; however, the tan δ (100° C.) value decreases. Thus, the object of the present invention, that is, improvement of vibration insulation properties at a high temperature, cannot be achieved. In contrast, if the ratio of the styrene acrylic-based resin used is greater than this range, kneading properties and roll processability are deteriorated, which is not preferable.

The styrene acrylic-based resin can also be used in combination with a styrene-based resin. The ratio of the styrene-based resin added is preferably 50 wt. % or less in the total amount of the styrene-based resin and the styrene acrylic-based resin, from the viewpoint that tan δ values are improved without impairing the particularly excellent kneader kneading properties of the styrene acrylic-based resin.

When a plasticizer, preferably an ester-based plasticizer (e.g., a polyether ester-based plasticizer) is added to the acrylic rubber composition in an amount of 2 to 40 parts by weight, preferably 5 to 30 parts by weight, based on 100 parts by weight of acrylic rubber, this is effective to improve moldability and tan δ values.

Any of kneader kneading properties, roll processability, and vulcanization molding properties of the acrylic rubber composition in which acrylic rubber and a styrene acrylic-based resin are used at the above ratio are excellent. Practically, for example, the components are kneaded by a pressurizing kneader, and then subjected to roll processing using an open roll. The resultant is vulcanized at about 180 to 200° C. for about 5 to 20 minutes, optionally followed by oven vulcanization (secondary vulcanization) at about 150 to 200° C. for about 1 to 15 hours.

Vulcanization is preferably performed using sulfur or a sulfur-containing vulcanization accelerator, such as 4,4'-dithiodimorpholine, tetramethylthiuram disulfide, tetraethylthiuram disulfide, tetrabuthylthiuram disulfide, 2-mercaptoimidazoline, tetramethylthiuram monosulfide, N-cyclohexyl-2-benzothiazole sulfenamide, dibenzothiazyl disulfide, or high molecular weight polysulfide, in an amount of about 0.1 to 5 parts by weight based on 100 parts by weight of acrylic rubber.

EXAMPLES

The following describes the present invention with reference to Examples.

Example 1

| | |
|---|---|
| Active chlorine group-containing acrylic rubber (Noxtite PA401-L, produced by Unimatec Co., Ltd.) | 100 parts by weight |
| Epoxy group-containing styrene acrylic resin (ARUFON UG-4040, produced by Toagosei Co., Ltd.) | 20 parts by weight |
| Sulfur | 0.2 parts by weight |

The above components were kneaded by a pressurizing kneader, and then subjected to roll processing using an open roll. The resultant was vulcanized at 190° C. for 8 minutes, followed by oven vulcanization (secondary vulcanization) at 175° C. for 5 hours, thereby forming a sheet-like material (thickness: 2 mm).

Kneading properties, roll processability, and vulcanization molding properties were evaluated. In addition, dynamic properties (tan δ) were measured.

Kneading Properties:

(1) No bridge (rubber block) in the gap between a rotor and a weight during kneading by a pressurizing kneader, and stable progress of the kneading process (2) No contamination in the kneader after the discharge of a compound When both (1) and (2) were very satisfied, the result was evaluated as ⊚; when both (1) and (2) were satisfied, the result was evaluated as ○; and when at least one of (1) and (2) was not satisfied, the result was evaluated as X Roll Processability:

(1) Low tackiness on the surface of the rubber compound (2) No cessation due to tackiness in the cutback operation for improving dispersibility; and the sheeting operation, for sheet feeding, and excellent roll processability When both (1) and (2) were satisfied, the result was evaluated as ○; and when at least one of (1) and (2) was not satisfied, the result was evaluated as X Vulcanization Molding Properties:

(1) No compound burning, poor compound flow, foaming, etc., under the above vulcanization conditions, and stable vulcanization molding properties (2) No bleeding etc. on the surface of the vulcanized sheet, and low surface tackiness When both (1) and (2) were satisfied, the result was evaluated as ◯; and when at least one of (1) and (2) was not satisfied, the result was evaluated as X Dynamic Properties (Tan δ):

The test was carried out referring to JIS K6394 corresponding to ISO 4664-1

The tensile method and the form and size of test pieces were as follows: strip-like materials (width: 6 mm and thickness: 2 mm), holder interval: 20 mm, average strain: 10%, strain amplitude: ±0.1%, frequency: 100 Hz, and test temperature: 23° C., 70° C., or 100° C.

In each temperature range, a tan δ of 0.2 or more was evaluated as excellent, and a tan δ of 0.3 or more was evaluated as more preferable

Example 2

In Example 1, the same amount of hydroxyl group-containing styrene acrylic resin (ARUFON UH-2170, produced by Toagosei Co., Ltd.) was used in place of the epoxy group-containing styrene acrylic resin.

Example 3

In Example 1, the amount of the epoxy group-containing styrene acrylic resin was changed to 40 parts by weight.

Comparative Example 1

In Example 1, no epoxy group-containing styrene acrylic resin was used.

Comparative Example 2

In Example 1, the same amount of carboxyl group-containing acrylic resin (ARUFON UC-3000, produced by Toagosei Co., Ltd.) was used in place of the epoxy group-containing styrene acrylic resin.

Comparative Example 3

In Example 1, the same amount of carboxyl group-containing styrene acrylic resin (ARUFON UF-5041, produced by Toagosei Co., Ltd.; containing long chain alkyl group) was used in place of the epoxy group-containing styrene acrylic resin.

Comparative Example 4

In Example 1, the same amount of aromatic modified terpene resin (YS RESIN TO105, produced by Yasuhara Chemical Co., Ltd.) was used in place of the epoxy group-containing styrene acrylic resin.

Comparative Example 5

In Example 1, the same amount of aromatic modified, hydrogenated terpene resin (CLEARON K4100, produced by Yasuhara Chemical Co., Ltd.) was used in place of the epoxy group-containing styrene acrylic resin.

Results of measurement or evaluation obtained in the foregoing Examples and Comparative Examples are shown in the following Table.

TABLE

| Measurement evaluation item | Example | | | | | | Comparative Example | | | | |
|---|---|---|---|---|---|---|---|---|---|---|---|
| | 1 | 2 | 3 | 4 | 5 | 6 | 1 | 2 | 3 | 4 | 5 |
| [Kneading·Processing properties] | | | | | | | | | | | |
| kneader kneading properties | ⊚ | ⊚ | ⊚ | ⊚ | ◯ | ◯ | ◯ | X | X | ◯ | X |
| roll processability | ◯ | ◯ | ◯ | ◯ | ◯ | ◯ | ◯ | X | X | ◯ | X |
| vulcanization molding properties | ◯ | ◯ | ◯ | ◯ | ◯ | ◯ | ◯ | X | X | ◯ | ◯ |
| [Dynamic properties] | | | | | | | | | | | |
| tan δ (23° C.) | 0.96 | 0.95 | 0.76 | 0.88 | 0.81 | 0.87 | 1.0 | — | — | 0.90 | 0.88 |
| tan δ (70° C.) | 0.34 | 0.25 | 0.31 | 0.55 | 0.43 | 0.31 | 0.24 | — | — | 0.20 | 0.20 |
| tan δ (100° C.) | 0.23 | 0.22 | 0.55 | 0.36 | 0.23 | 0.47 | 0.14 | — | — | 0.17 | 0.26 |

Example 4

In Example 3, 7.5 parts by weight of a polyether ester-based plasticizer (RS735, produced by ADEKA Co., Ltd.) was further used.

Example 5

In Example 3, 20 parts by weight of a polyether ester-based plasticizer (RS-735) was further used.

Example 6

In Example 1, 20 parts by weight of a styrene resin (YS RESIN SX100, produced by Yasuhara Chemical Co., Ltd.) was further used.

The invention claimed is:

1. An acrylic rubber composition comprising 20 to 80 parts by weight of a functional group-containing styrene acrylic-based resin containing a hydroxyl group or an epoxy group as the functional group, and 0.1 to 5 parts by weight of sulfur or a sulfur-containing vulcanization accelerator, based on 100 parts by weight of acrylic rubber.

2. The acrylic rubber composition according to claim 1, wherein 50 wt. % or less of the functional group-containing styrene acrylic-based resin is replaced by a styrene resin.

3. The acrylic rubber composition according to claim 1, wherein 2 to 40 parts by weight of an ester-based plasticizer, based on 100 parts by weight of acrylic rubber is further added.

4. A vibration insulation member obtained by vulcanizing molding of the acrylic rubber composition according to claim 1.

5. The vibration insulation member according to claim 4, which is used as an automobile mount or grommet in a high temperature environment.

6. The acrylic rubber composition according to claim 1, wherein 50 wt. % or less of the functional group-containing styrene acrylic-based resin is replaced by a styrene resin.

7. The acrylic rubber composition according to claim 2, wherein 2 to 40 parts by weight of an ester-based plasticizer is further added.

8. The acrylic rubber composition according to claim 6, wherein 2 to 40 parts by weight of an ester-based plasticizer is further added.

9. A vibration insulation member obtained by vulcanizing molding of the acrylic rubber composition according to claim 1.

10. A vibration insulation member obtained by vulcanizing molding of the acrylic rubber composition according to claim 2.

11. A vibration insulation member obtained by vulcanizing molding of the acrylic rubber composition according to claim 6.

12. A vibration insulation member obtained by vulcanizing molding of the acrylic rubber composition according to claim 3.

13. A vibration insulation member obtained by vulcanizing molding of the acrylic rubber composition according to claim 7.

14. A vibration insulation member obtained by vulcanizing molding of the acrylic rubber composition according to claim 8.

15. The vibration insulation member according to claim 9, which is used as an automobile mount or grommet in a high temperature environment.

16. The vibration insulation member according to claim 10, which is used as an automobile mount or grommet in a high temperature environment.

17. The vibration insulation member according to claim 11, which is used as an automobile mount or grommet in a high temperature environment.

18. The vibration insulation member according to claim 12, which is used as an automobile mount or grommet in a high temperature environment.

19. The vibration insulation member according to claim 13, which is used as an automobile mount or grommet in a high temperature environment.

* * * * *